United States Patent
Vanholme

(10) Patent No.: US 10,198,951 B2
(45) Date of Patent: Feb. 5, 2019

(54) MODELS OF THE SURROUNDINGS FOR VEHICLES

(71) Applicant: Bayerische Motoren Werke Aktiengesellschaft, Munich (DE)

(72) Inventor: Benoit Vanholme, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 328 days.

(21) Appl. No.: 15/010,656

(22) Filed: Jan. 29, 2016

(65) Prior Publication Data

US 2016/0148510 A1 May 26, 2016

Related U.S. Application Data

(63) Continuation of application No. PCT/EP2014/065917, filed on Jul. 24, 2014.

(30) Foreign Application Priority Data

Aug. 1, 2013 (DE) .................. 10 2013 215 098

(51) Int. Cl.
*G08G 1/16* (2006.01)
*B60W 30/08* (2012.01)
(Continued)

(52) U.S. Cl.
CPC ............... *G08G 1/16* (2013.01); *B60W 30/08* (2013.01); *B60W 40/04* (2013.01); *G08G 1/165* (2013.01); *G08G 1/166* (2013.01); *G06K 9/00805* (2013.01)

(58) Field of Classification Search
CPC .......... G08G 1/16; G08G 1/166; G08G 1/165; B60W 40/04; B60W 30/08; G06K 9/00805
See application file for complete search history.

(56) References Cited

U.S. PATENT DOCUMENTS

| 8,164,432 B2 | 4/2012 | Broggi et al. |
| 8,179,281 B2 | 5/2012 | Strauss |

(Continued)

FOREIGN PATENT DOCUMENTS

| DE | 103 41 753 A1 | 4/2005 |
| DE | 10 2006 000 640 A1 | 7/2007 |

(Continued)

OTHER PUBLICATIONS

Seo, Y. & Urmson, C. "A perception mechanism for supporting autonomous intersection handling in urban driving" IEEE Int'l Conf. on Intelligent Robots & Sys., pp. 1830-1835 (2008) (Year: 2008).*

(Continued)

*Primary Examiner* — Jay Hann
(74) *Attorney, Agent, or Firm* — Crowell & Moring LLP

(57) ABSTRACT

A method for providing a model of surroundings for a vehicle includes providing a model of the surroundings based on sensor measurements by sensors of the vehicle, wherein the model of the surroundings provides information relating to an occupation of the surroundings by one or more objects, including information regarding a type of object in the surroundings of the vehicle. The method includes determining a region of the surroundings for which no information relating to occupation by objects is provided by the model of the surroundings, wherein the region is within a distance limit for which the sensors can provide sensor measurements relating to the occupation by objects, and checking whether a phantom object is to be added to the model of the surroundings in the region based on the type of object and predefined regulations, wherein the phantom object is an object which was not determined on the basis of sensor measurements. In the event the phantom object is determined to be added, the method further includes deter- (Continued)

mining the occupation by the phantom object in the region of the surroundings, and generating an extended model of the surroundings by adding information relating to the occupation by the phantom object to the model of the surroundings, and then providing the extended model of the surroundings.

17 Claims, 1 Drawing Sheet

(51) Int. Cl.
  *B60W 40/04* (2006.01)
  *G06K 9/00* (2006.01)

(56) References Cited

U.S. PATENT DOCUMENTS

| | | | |
|---|---|---|---|
| 8,258,980 B2* | 9/2012 | Becker | B60W 40/076 340/435 |
| 8,660,734 B2* | 2/2014 | Zhu | B60W 30/08 701/23 |
| 8,793,046 B2* | 7/2014 | Lombrozo | B60W 40/00 701/117 |
| 8,825,350 B1* | 9/2014 | Robinson | G06K 9/00785 340/909 |
| 9,766,626 B1* | 9/2017 | Zhu | G05D 1/0088 |
| 2012/0101704 A1 | 4/2012 | Wagner | |

FOREIGN PATENT DOCUMENTS

| | | |
|---|---|---|
| DE | 10 2007 048 809 A1 | 7/2008 |
| DE | 10 2009 007 395 A1 | 10/2009 |
| DE | 10 2009 023 326 A1 | 2/2010 |
| DE | 10 2009 030 431 A1 | 2/2010 |
| DE | 10 2010 007 884 A1 | 12/2010 |
| DE | 10 2009 027 755 A1 | 1/2011 |
| DE | 10 2010 006 828 A1 | 8/2011 |
| DE | 10 2010 025 351 A1 | 12/2011 |
| DE | 10 2010 049 091 A1 | 4/2012 |
| DE | 10 2010 062 350 A1 | 6/2012 |
| DE | 10 2012 000 724 A1 | 1/2013 |
| EP | 2 390 862 A2 | 11/2011 |

OTHER PUBLICATIONS

Fayad, F. & Cherfaoui, V. "Tracking objects using a laser scanner in driving situation based on modeling target shape" IEEE Proceedings of Intelligent Vehicles Symp., pp. 44-49 (2007). (Year: 2007).*
Geronimo, D., et al. "Survey of Pedestrian Detection for Advanced Driver Assistance Systems" IEEE Transactions on Pattern Analysis & Machine Intelligence, pp. 1239-1258 (2010). (Year: 2010).*
PCT/EP2014/065917, International Search Report dated Oct. 8, 2014 (Three (3) pages).
German Search Report issued in German counterpart application No. 10 2013 215 098.9 dated Feb. 11, 2014, with Statement of Relevancy (Six (6) pages).
PCT/EP2014/065916, International Search Report dated Oct. 9, 2014 (Three (3) pages).
German Search Report issued in German counterpart application No. 10 2013 215 100.4 dated Sep. 3, 2014, with Statement of Relevancy (Eight (8) pages).
Vanholme, et al., "A Legal Safety Concept for Highly Automated Driving on Highways", Intelligent Vehicles Symposium (IV), IEEE 2011, Baden-Baden, Germany, Jun. 5-9, 2011, pp. 563-570, ISSN 1931-0587.
Vanholme, Benoit, "Highly Automated Driving on Highways based on Legal Safety", Dissertation, Jun. 18, 2012. URL: http://wwwbiblo.univ-evry.fr/theses/2012/2012EVRY0018.pdf, 221 pages.

* cited by examiner

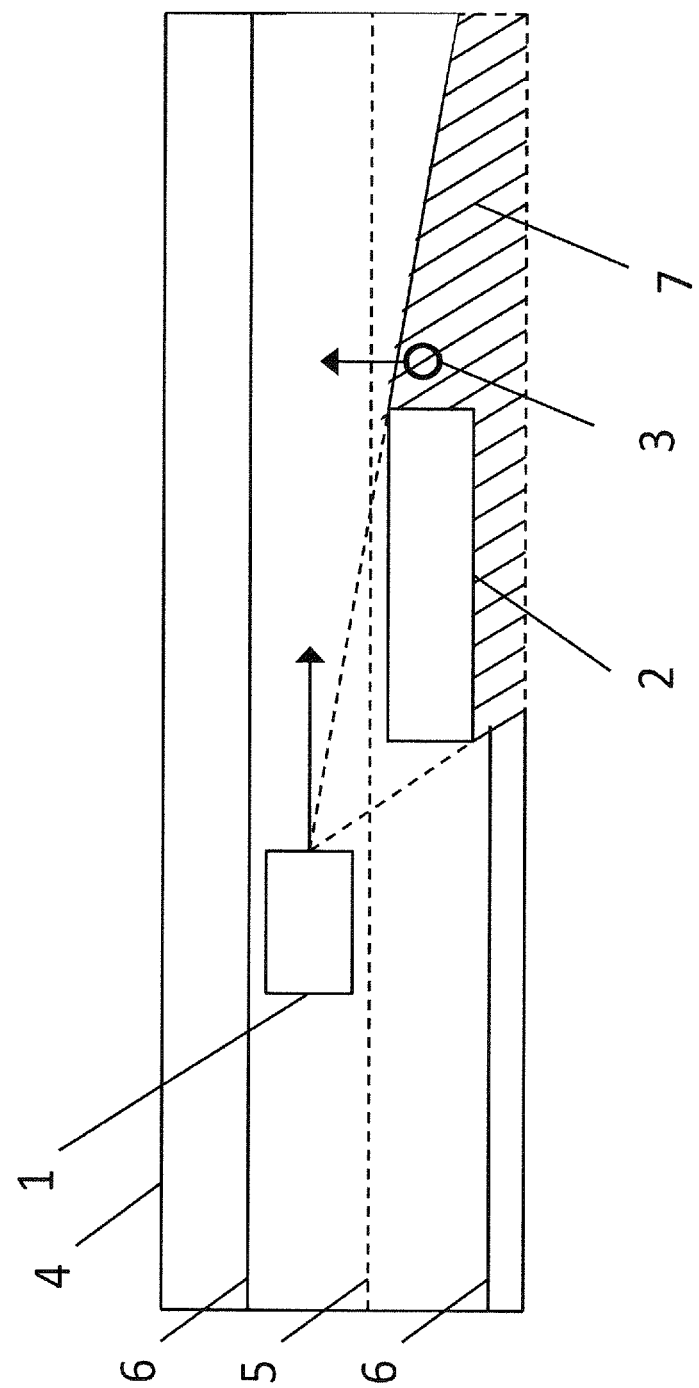

MODELS OF THE SURROUNDINGS FOR VEHICLES

CROSS REFERENCE TO RELATED APPLICATIONS

This application is a continuation of PCT International Application No. PCT/EP2014/065917, filed Jul. 24, 2014, which claims priority under 35 U.S.C. § 119 from German Patent Application No. 10 2013 215 098.9, filed Aug. 1, 2013, the entire disclosures of which are herein expressly incorporated by reference.

BACKGROUND AND SUMMARY OF THE INVENTION

The invention relates to a method for providing a model of the surroundings for a vehicle, to a corresponding computer program and a computing apparatus and to a vehicle for the same purpose.

In future, motor vehicles will have an abundance of driver assistance systems which warn the driver of collisions, for example, and possibly also attempt to avoid collisions by means of interventions. Examples of such driver assistance systems are an emergency brake assistant, a lane-keeping assistant, a blind spot assistant, a parking assistant and a so-called automatic cruise control (ACC) assistant, in particular for freeway journeys. In addition, highly automated driving, that is to say the movement of a vehicle without (or substantially without) human intervention, also presupposes knowledge of the surroundings of the vehicle. In order to provide these functions, knowledge of the surroundings of the vehicle is decisive for driver assistance systems. For this purpose, the surroundings are scanned or recorded using one or more sensors such as radar, lidar, camera, ultrasonic sensors or similar sensors known from the prior art. The occupation of the surroundings by objects is then detected with the aid of the sensor measurements with the aid of signal processing methods which are likewise known in the prior art. The occupation indicates that the surroundings cannot be traversed by the vehicle in a particular section and therefore indicates the position of the object. The type of objects is additionally detected, that is to say whether the objects are pedestrians, vehicles, road boundaries, etc. The detected occupation and the types of objects are used to create a model of the surroundings which provides information relating to the occupation of the surroundings by objects, that is to say, in particular, those sections of the surroundings which are occupied by objects, and the type of objects.

One concept for highly automated driving on freeways on the basis of a model of the surroundings is presented, for example, in "A legal safety concept for highly automated driving on highways" by Benoit Vanholme, et al., Intelligent Vehicles Symposium (IV), 2011 IEEE, Jun. 5-9, 2011, pages 563-570. Such a concept is likewise presented in the dissertation "Highly Automated Driving on Highways based on Legal Safety", University of Evry-Val-d'Esssonne dated Jun. 18, 2012 by Benoit Vanholme. This publication also presents the concept of phantom objects. In this publication, a phantom object is a fictitious object which is assumed at a distance for which no occupation can be created with the aid of the sensors of the vehicle because the measurement range of the sensors has been exceeded.

In addition, when creating a model of the surroundings, the problem exists that no objects can be detected in regions of the surroundings which are concealed by objects in so far as the objects prevent sensor measurements in these regions. The model of the surroundings does not provide any information relating to the occupation by objects for these regions. For example, a stopped bus may conceal a pedestrian in front of the bus. Consequently, no information relating to this pedestrian would be present in the model of the surroundings. If the pedestrian then emerges behind the bus, his occupation will suddenly appear in the model of the surroundings and will cause a possibly severe and sudden reaction by the driver assistance systems. There is also an increased risk of an accident.

An object of the invention is to enable driver assistance systems based on models of the surroundings to take into account possible concealed objects.

In one aspect, a method for providing a model of the surroundings for a vehicle comprises: providing a model of the surroundings which was obtained on the basis of sensor measurements by sensors of the vehicle, the model of the surroundings providing information relating to the occupation of the surroundings by objects and, in particular, the type of objects in the surroundings of the vehicle; determining a region of the surroundings for which no information relating to occupation by objects is provided by the model of the surroundings, the region being within a distance limit for which the model of the surroundings could provide information relating to the occupation by objects on the basis of sensor measurements; checking whether a phantom object needs to be added to the model of the surroundings in the region, in particular using a predefined regulation; if a phantom object needs to be added: determining the occupation by the phantom object in the region of the surroundings, and generating an extended model of the surroundings by adding information relating to the occupation by the phantom object to the model of the surroundings; providing the extended model of the surroundings. The type of object may also relate only to whether the object is moving or is stationary.

A virtual object, a phantom object, is therefore assumed in the model of the surroundings for the concealed region of the surroundings. Phantom objects are, in particular, assumptions of concealed other road users and therefore a safety measure. This assumption compensates for the "blindness" of the sensor systems for concealed regions. Driver assistance systems, in particular systems for highly automated driving, can therefore take the object into account in their planning and function. The precautionary measure of the driver assistance systems is therefore moved to the model of the surroundings by the respective driver assistance system itself in one implementation. The safety measure in the model of the surroundings would therefore have an effect on all driver assistance systems which use the model of the surroundings. In addition, phantom objects can also be added by a driver assistance system or by a component between the creation of the surroundings and the driver assistance system.

As a result of the inclusion of the phantom objects, driver assistance systems can adapt their function in the best possible way to the traffic situation (for example can limit the speed) and can therefore avoid possible accidents or drastically reduce damage. In one typical implementation, a phantom object can be distinguished from a real object (detected using sensor measurements) in the model of the surroundings. The phantom object is therefore indicated as such. Driver assistance systems can now include phantom objects differently than real objects in their function, in particular journey planning or trajectory planning and selection, and therefore do not react to phantom objects to the same extent as they do for real objects. For example, a driver assistance system would not plan any delay in the journey planning for a relatively slow phantom object (even though it would do so for a relatively slow real object) but would nevertheless plan, in the journey planning (for example for future travel trajectories or speeds), that an accident can be avoided or mitigated if it subsequently emerges, on the basis of sensor measurements, that a real object is at the occupation of the phantom object. In an alternative implementation, a probability for its actual existence is assigned to each object in the model of the surroundings. This probability can generally be set lower for phantom objects than for objects which have been detected using sensor measurements.

When checking whether a phantom object can be assumed in a concealed region, it is advantageously assumed that the phantom objects, that is to say pedestrians or cyclists, for example, comply with the traffic rules or at least behave in a predictable manner (and in the process do not comply with the traffic rules). It is assumed, for example, that a pedestrian is on a pedestrian crossing which is concealed by a vehicle. At the same time, a phantom object need not be assumed for each concealed region. For example, a pedestrian is not automatically assumed as a phantom object behind a freeway pillar on a freeway.

In one development, the checking operation comprises the determination of whether an object in the surroundings prevents sensor measurements by sensors of the vehicle in the region at least in such a manner that no information can be provided by the model of the surroundings for this region. The region is therefore concealed by the object for sensor measurements and the object is a concealing object.

In one development, the determination of the occupation by the phantom object in the region of the surroundings comprises: determining the type of preventing object and determining an assumption with respect to the occupation by the phantom object and an assumption with respect to the type of phantom object with the aid of a pre-stored assignment. The assignment may specify rules or regulations regarding where the phantom object should be placed and where its occupation is. The occupation can be oriented to the model of the surroundings and its limits and to the preventing objects. The computing means are set up to use these rules or regulations in order to determine the occupation by the phantom object.

The assignment may specify a rule for the occupation by the phantom object, the rule spatially relating the occupation to the region and/or the object, in particular. A separate rule can be specified for each type of concealing object.

The type of preventing object may also relate to the difference between a stationary object and a moving preventing object. Therefore, only two types may exist in some implementations: a stationary object and a moving preventing object.

In one implementation, the checking operation also takes into account the type of preventing object, in particular using a predetermined list. A phantom object can therefore be assumed for some preventing objects and cannot be assumed for others. If the preventing object is a bus, a phantom object in front of the bus can be assumed. If the preventing object is a bush on a traffic island, for example, no phantom object needs to be assumed behind this bush.

The method can also comprise: determining the type of phantom object to be added and, in particular, its occupation of the surroundings on the basis of the type of preventing object, in particular using a predetermined assignment which comprises the list, in particular. If a bus is the preventing object, for example, a pedestrian can be assumed as the type of phantom object in front of the bus but not a motorcyclist. The type of phantom object can depend on a predetermined assignment. The assignment links the type of object to the type of phantom object. The type of object alone can be understood as meaning a list indicating the types of preventing objects for which phantom objects are assumed. Furthermore, the occupation of the surroundings by the phantom object, that is to say its position, is determined, in particular. The occupation can be determined using the distance limit, with the result that the occupation is positioned precisely on the far side of the limit for which sensor measurements are still available, in other words: precisely within the region or at the boundary of the region (for example 1 m or 0.5 m away from the boundary of the region). The occupation by the phantom object can be specified by means of a pre-stored assignment.

Furthermore, the type of phantom object to be added can be determined on the basis of the type of environment and/or the time of day. For example, in the environment of a school, a (playing) child can be assumed as a phantom object (which moves onto the road from the concealed region) behind a parked and preventing vehicle during the day. Conversely, a pedestrian is not assumed behind a vehicle on a country road at night.

In one preferred development, the checking operation also takes into account whether the traffic rules or predefined further rules applicable in the region provide for other road users to be in the region. The checking aspect with respect to the traffic rules can be carried out on the basis of detected road markings (for example part of a zebra crossing or a road marking and its assumed continuation). The checking aspect with respect to the further rules can be carried out on the basis of predefined regulations. In order to avoid providing too many phantom objects in the extended model of the surroundings, phantom objects are assumed only where they can also be expected in all probability, that is to say only in a concealed region in which the traffic rules or the predefined further rules simultaneously provide for other road users. For example, pedestrians can be expected at a pedestrian crossing concealed by a stationary vehicle or in front of a stationary bus or an automobile can be expected in front of a truck to be overtaken. In this case, other road users cannot only be assumed where the traffic rules provide for this, but also where they are typically situated, that is to say in front of a stationary bus without a pedestrian crossing, for example. In order to ensure a useful method of operation of driver assistance systems, all possible phantom objects should not be included irrespective of traffic rules or other rules, that is to say no collapsing bridges or a group of drivers traveling in the wrong direction on the freeway. The methods of operation of driver assistance systems would otherwise be greatly jeopardized. When selecting the further rules (which go beyond the traffic rules), a balance between defensiveness and assertiveness is advantageously found. Another rule is, for example, that, although the other road user does not comply with the traffic rules, he nevertheless behaves in a predictable manner and is subjectively defensive.

In one development, the method also comprises: if a phantom object needs to be added: determining the direction of movement, a plurality of possible future trajectories of the phantom object and their associated occurrence probabilities and/or the behavior of the phantom object to be added; and supplementing the extended model of the surroundings with information relating to the direction of movement. The direction of movement can be determined using the type of preventing object and the arrangement of the objects on the road. The possible future trajectories and their occurrence probabilities and the behavior can likewise be determined using the type of preventing object and the arrangement of the objects on the road. In this case, it is possible to resort to pre-stored scenarios (typical constellations of types and arrangements). It can therefore be assumed, for example, that a pedestrian concealed by a stopped bus crosses the road. A "worst-case" assumption can always be made for the direction of movement, that is to say the direction of movement is on a collision course with the direction of travel of the vehicle. A driver assistance system would then be set up (also when taking a plurality of trajectories into account) to minimize the risk of collision.

In another aspect, a computer program causes a computer to carry out one of the methods above during the execution of the computer program.

In another aspect, a computing apparatus comprises electronic computing means which are set up to carry out one of the methods above. The electronic computing means may be a computer, a microcontroller or dedicated circuits. The computing apparatus may be caused to carry out the method by a computer program.

In yet another aspect, a motor vehicle comprises sensors for detecting objects in the surroundings of the vehicle and above computing means.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows an exemplary addition to the model of the surroundings according to one exemplary embodiment.

DETAILED DESCRIPTION OF THE DRAWING

FIG. 1 shows an exemplary addition to the model of the surroundings according to one exemplary embodiment. A vehicle 1 is on a road, which is indicated by the road boundary 6 and the median strip 5, and is moving according to the illustrated arrow. The vehicle 1 has sensors for detecting the surroundings and creates a model of the surroundings with the aid of the sensor measurements. This model indicates the occupation of the surroundings by objects and their type. The model of the surroundings depicts the surroundings in the section 4 which is defined by the range of the sensors and computing capacities. In the surroundings, the vehicle 1 detects the road boundaries 6, the median strip 5 and the bus 2 in the right-hand lane. The sensors for the front region of the vehicle are accommodated approximately in the center of the front of the vehicle. Accordingly, the stopped bus 2 conceals a region 7 of the surroundings (illustrated in hatched form in FIG. 1) which could otherwise be scanned using the sensors and in which objects could otherwise be detected. In order to explain the concealment on account of the bus 2, the viewing angles of the sensors in the center of the front of the vehicle 1 are depicted using dashed lines. The vehicle comprises computing means which create a model of the surroundings with the aid of the sensor measurements. The computing means also check whether a phantom object needs to be added to the model of the surroundings. For this purpose, the type of object 2 is taken into account, namely the fact that the object 2 is a stopped bus. An assignment stores the fact that a pedestrian needs to be added to the model of the surroundings as the phantom object for a stopped bus. The assignment also stores the occupation by the pedestrian 3 (his placement) for the stationary bus 2, namely the fact that the pedestrian can be assumed to be at a distance of 1 m in front of the bus 2 at the limit of the model of the surroundings; this corresponds to a rule which is specified for this region and does not correspond to the traffic rules. Consequently, the computing means determine a phantom object 3 of the pedestrian type at the specified occupation. The direction of movement to the center of the road is assigned to the phantom object 3, as is likewise stored in the pre-stored assignment (indicated by the arrow in FIG. 1). The model of the surroundings is extended with the information relating to the occupation, the type and the direction of movement of the phantom object 3. This extended movement model is provided and can be used by driver assistance systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a driver assistance system of a vehicle, the driver assistance system configured to execute a driver assistance function based on a model of surroundings for a vehicle, comprising:
  generating a model of the surroundings based on sensor measurements by sensors of the vehicle, wherein the model of the surroundings provides information relating to an occupation of the surroundings by one or more objects, including information regarding a type of object in the surroundings of the vehicle;
  determining a region of the surroundings for which no information relating to occupation by objects is provided by the model of the surroundings, wherein the region is within a distance limit for which the sensors can provide sensor measurements relating to the occupation by objects;
  checking whether a phantom object is to be added to the model of the surroundings in the region based on the type of object in the surroundings of the vehicle and predefined regulations, wherein the phantom object is an object which was not determined on the basis of sensor measurements,
  wherein in the event the phantom object is determined to be added, the method further comprises:
  determining the occupation by the phantom object in the region of the surroundings, and generating an extended model of the surroundings by adding information relating to the occupation by the phantom object to the model of the surroundings; and
  controlling the function of a driver assistance system of the vehicle based on the extended model of the surroundings.

2. The method as claimed in claim 1, wherein said checking is carried out according to predefined and stored rules.

3. The method as claimed in claim 1, in the event the phantom object is determined to be added, the method further comprises:
  determining a direction of movement of the phantom object to be added based on an assignment; and
  supplementing the extended model of the surroundings with information relating to the direction of movement.

4. The method as claimed in claim 1, wherein said checking further takes into account whether applicable traffic rules or predefined further rules detected in the region in the model of the surroundings provide for other road users to be in the region.

5. The method as claimed in claim 4, in the event the phantom object is determined to be added, the method further comprises:
   determining a direction of movement of the phantom object to be added based on an assignment; and
   supplementing the extended model of the surroundings with information relating to the direction of movement.

6. The method as claimed in claim 1, wherein checking whether the phantom object is to be added to the model comprises determining whether an object in the surroundings is preventing sensor measurements by the sensors of the vehicle in the region such that no information can be provided by the model of the surroundings for this region.

7. The method as claimed in claim 6, wherein said checking further takes into account whether applicable traffic rules or predefined further rules detected in the region in the model of the surroundings provide for other road users to be in the region.

8. The method as claimed in claim 6, in the event the phantom object is determined to be added, the method further comprises:
   determining a direction of movement of the phantom object to be added based on an assignment; and
   supplementing the extended model of the surroundings with information relating to the direction of movement.

9. The method as claimed in claim 6, wherein said checking further takes into account a type of the object that is preventing sensor measurements by the sensors of the vehicle in the region using a predetermined list.

10. The method as claimed in claim 9, wherein said checking further takes into account whether applicable traffic rules or predefined further rules detected in the region in the model of the surroundings provide for other road users to be in the region.

11. The method as claimed in claim 9, in the event the phantom object is determined to be added, the method further comprises:
   determining a direction of movement of the phantom object to be added based on an assignment; and
   supplementing the extended model of the surroundings with information relating to the direction of movement.

12. The method as claimed in claim 9, further comprising determining a type of phantom object and its occupation of the surroundings based on the type of the object that is preventing sensor measurements by the sensors of the vehicle in the region, wherein said determining the type of phantom object is based on a predetermined assignment that comprises the predetermined list.

13. The method as claimed in claim 12, wherein the predetermined assignment specifies a rule spatially relating the occupation to the region and/or to the object.

14. The method as claimed in claim 12, wherein said checking further takes into account whether applicable traffic rules or predefined further rules detected in the region in the model of the surroundings provide for other road users to be in the region.

15. The method as claimed in claim 12, in the event the phantom object is determined to be added, the method further comprises:
   determining a direction of movement of the phantom object to be added based on an assignment; and
   supplementing the extended model of the surroundings with information relating to the direction of movement.

16. A computing apparatus comprising electronic computing means configured to control a driver assistance system of a vehicle to execute a driver assistance function based on a model of the vehicle's surroundings, the electronic computing means being configured to:
   generate a model of the surroundings based on sensor measurements by sensors of the vehicle, wherein the model of the surroundings provides information relating to an occupation of the surroundings by one or more objects, including information regarding a type of object in the surroundings of the vehicle;
   determine a region of the surroundings for which no information relating to occupation by objects is provided by the model of the surroundings, wherein the region is within a distance limit for which the sensors can provide sensor measurements relating to the occupation by objects;
   check whether a phantom object is to be added to the model of the surroundings in the region based on the type of object in the surroundings of the vehicle and predefined regulations, wherein the phantom object is an object which was not determined on the basis of sensor measurements,
   wherein in the event the phantom object is determined to be added, the electronic computing means is further configured to:
   determine the occupation by the phantom object in the region of the surroundings, and generating an extended model of the surroundings by adding information relating to the occupation by the phantom object to the model of the surroundings; and
   control the driver assistance function based on the extended model of the surroundings.

17. A motor vehicle comprising:
   sensors for detecting objects in the surroundings of the vehicle, including a first sensor; and
   the computing apparatus as claimed in claim 16.

* * * * *